(12) United States Patent
Oteri et al.

(10) Patent No.: US 10,568,119 B2
(45) Date of Patent: Feb. 18, 2020

(54) CLASSIFICATION AND SILENCING FOR UPLINK MULTI-USER TRANSMISSIONS IN WLANS

(71) Applicant: INTERDIGITAL PATENT HOLDINGS, INC., Wilmington, DE (US)

(72) Inventors: Oghenekome Oteri, San Diego, CA (US); Hanqing Lou, Syosset, NY (US); Fengjun Xi, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/083,028

(22) PCT Filed: Mar. 9, 2017

(86) PCT No.: PCT/US2017/021487
§ 371 (c)(1),
(2) Date: Sep. 7, 2018

(87) PCT Pub. No.: WO2017/156211
PCT Pub. Date: Sep. 14, 2017

(65) Prior Publication Data
US 2019/0090259 A1    Mar. 21, 2019

Related U.S. Application Data

(60) Provisional application No. 62/307,143, filed on Mar. 11, 2016.

(51) Int. Cl.
*H04W 72/12* (2009.01)
*H04B 7/0452* (2017.01)
(Continued)

(52) U.S. Cl.
CPC ...... *H04W 72/1268* (2013.01); *H04B 7/0452* (2013.01); *H04W 28/0242* (2013.01);
(Continued)

(58) Field of Classification Search
CPC ............. H04W 72/082; H04W 72/042; H04W 72/1268; H04W 28/0242; H04W 84/12; H04B 7/0452; H04J 11/0023
See application file for complete search history.

(56) References Cited

U.S. PATENT DOCUMENTS

10,085,262 B2   9/2018   Choi et al.
2012/0064904 A1   3/2012   Lee et al.
(Continued)

FOREIGN PATENT DOCUMENTS

EP    2 988 462    2/2016
WO    15/076917    3/2015

OTHER PUBLICATIONS

Azizi et al., "OFDMA Numerology and Structure," IEEE 802.11-15/0330r5 (May 2015).
(Continued)

*Primary Examiner* — Curtis A Alia
(74) *Attorney, Agent, or Firm* — Volpe and Koenig, P.C.

(57) ABSTRACT

Method, apparatuses, and systems for multi-user (MU) transmission is provided, including scheduling, by an access point (AP), an uplink (UL) MU transmission for a group of wireless transmit/receive units (WTRUs) in which there is an indication that at least one resource unit (RU) of a plurality of RUs is silenced. The silencing may be based on coordinating with one or more overlapping APs or by analyzing conditions of channels associated with an AP.

13 Claims, 18 Drawing Sheets

HE-SIG-B Encoding for exemplary RU allocation

(51) Int. Cl.
H04W 72/04 (2009.01)
H04W 28/02 (2009.01)
H04W 72/08 (2009.01)
H04W 84/12 (2009.01)

(52) U.S. Cl.
CPC ....... *H04W 72/042* (2013.01); *H04W 72/082* (2013.01); *H04W 84/12* (2013.01)

(56) References Cited

U.S. PATENT DOCUMENTS

| | | | |
|---|---|---|---|
| 2013/0229996 | A1 | 9/2013 | Wang et al. |
| 2013/0286959 | A1 | 10/2013 | Lou et al. |
| 2016/0353322 | A1* | 12/2016 | Li .............................. H04L 5/00 |
| 2017/0164387 | A1 | 6/2017 | Lou et al. |
| 2017/0303280 | A1 | 10/2017 | Chun et al. |

OTHER PUBLICATIONS

Bharadwaj et al., "Power Control for UL MU," IEEE 802.11-16/0413r0 (Mar. 14, 2016).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 3: TV White Spaces Operation, IEEE P802.11af/D1.02 (Jun. 2011).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D0.3 (Aug. 2016).
IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.1 1-REVmb/D12 (Nov. 2011).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
Kim et al., "HE-SIG-B Structure," IEEE 802.11-15/0821r2 (Jul. 11, 2015).
Kwon et al., "SIG Field Design Principle for 11ax," IEEE 802.11-15/0344r2 (Mar. 9, 2015).
Liu et al., "HE-SIG-B Contents," IEEE 802.11-15/1335r2 (Nov. 9, 2015).
Oteri et al., "Power Control for Multi-User Transmission in 802.11ax," IEEE 802.11-16/0331r1 (Mar. 13, 2016).
Oteri et al., "Power Control for Multi-User Transmission in 802.11ax," IEEE 802.11-16/0331r2 (Mar. 13, 2016).
Stacey et al., "Proposed TGax draft specification," IEEE 802.11-16/0024r1 (Mar. 2, 2016).
Stacey, "Specification Framework for TGax," IEEE 802.11-15/0132r15 (Jan. 28, 2016).
Third Generation Partnership Project, "Technical Specification Group Radio Access Network; Evolved Universal Terrestrial Radio Access (E-UTRA); Physical channels and modulation (Release 12)," 3GPP TS 36.211 V13.4.0 (Dec. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.1.0 (Dec. 2016).
Third Generation Partnership Project, "Technical Specification Group Radio Access Network; Evolved Universal Terrestrial Radio Access (E-UTRA); Physical channels and modulation (Release 12)," 3GPP TS 36.211 V13.0.0 (Dec. 2015).
Van Nee, "Uplink MU-MIMO Sensitivity to Power Differences and Synchronization Errors," IEEE 802.11-09/1036-00-00ac (Sep. 2009).
Wilhelmsson et al., "Analysis of frequency and power requirements for UL-OFDMA," IEEE 802.11-14/1446r0 (Nov. 2014).
Yunoki et al., "Considerations on HE-SIG-A/B," IEEE 802.11-15/827r2 (Jul. 15, 2015).
Son et al., "Discussion on Signaling for UL HE MU PPDU," IEEE 802.11-17/0110r0 (Jan. 16, 2017).

* cited by examiner

| Common HE-SIG-B Common TXPwr signaling Class A only [1 0] | User HE-SIG-B1 | User HE-SIG-B2 | User HE-SIG-B3 | User HE-SIG-B4 |
|---|---|---|---|---|
| | | | | |

FIG. 6A Class A Only: TxPwr signaling

| Common HE-SIG-B Common TXPwr signaling Class B only [0 1] | User HE-SIG-B1 TxPwr accuracy signaling | User HE-SIG-B2 TxPwr accuracy signaling | User HE-SIG-B3 TxPwr accuracy signaling | User HE-SIG-B4 TxPwr accuracy signaling |
|---|---|---|---|---|

FIG. 6B Class B Only: TxPwr signaling

| Common HE-SIG-B Class B only [0 1] | User HE-SIG-B1 Target and TxPwr accuracy signaling | User HE-SIG-B2 Target and TxPwr accuracy signaling | User HE-SIG-B3 Target and TxPwr accuracy signaling | User HE-SIG-B4 Target and TxPwr accuracy signaling |
|---|---|---|---|---|

FIG. 6C Class B Only: TxPwr signaling

| Common HE-SIG-B Common TXPwr signaling Class A and B [1 1] | User HE-SIG-B1 | User HE-SIG-B2 | User HE-SIG-B3 Target and TxPwr accuracy signaling | User HE-SIG-B4 Target and TxPwr accuracy signaling |
|---|---|---|---|---|

FIG. 6D Class A and B: TxPwr signaling

| Common HE-SIG-B Common TXPwr signaling No class signaling | User HE-SIG-B1 | User HE-SIG-B2 | User HE-SIG-B3 Target and TxPwr accuracy signaling | User HE-SIG-B4 Target and TxPwr accuracy signaling |
|---|---|---|---|---|

FIG. 6E Class A and B: TxPwr signaling

| 8 bits indices | #1 | #2 | #3 | #4 | #5 | #6 | #7 | #8 | #9 | Num of entries |
|---|---|---|---|---|---|---|---|---|---|---|
| 000 0 0000 | 26 | 26 | 26 | 26 | 26 | 26 | 26 | 26 | 26 | 1 |
| 000 0 0001 | 26 | 26 | 26 | 26 | 26 | 26 | 26 | 52 | | 1 |
| 000 0 0010 | 26 | 26 | 26 | 26 | 26 | 52 | 26 | 26 | | 1 |
| 000 0 0011 | 26 | 26 | 26 | 26 | 26 | 52 | 52 | | | 1 |
| 000 0 0100 | 26 | 26 | 52 | 26 | 26 | 26 | 26 | 26 | | 1 |
| 000 0 0101 | 26 | 26 | 52 | 26 | 26 | 26 | 52 | | | 1 |
| 000 0 0110 | 26 | 26 | 52 | 26 | 52 | 26 | 26 | | | 1 |
| 000 0 0111 | 26 | 26 | 52 | 26 | 52 | 52 | | | | 1 |
| 000 0 1000 | 52 | 26 | 26 | 26 | 26 | 26 | 26 | 26 | | 1 |
| 000 0 1001 | 52 | 26 | 26 | 26 | 26 | 26 | 52 | | | 1 |
| 000 0 1010 | 52 | 26 | 26 | 26 | 52 | 26 | 26 | | | 1 |
| 000 0 1011 | 52 | 26 | 26 | 26 | 52 | 52 | | | | 1 |
| 000 0 1100 | 52 | 52 | 26 | 26 | 26 | 26 | 26 | | | 1 |
| 000 0 1101 | 52 | 52 | 26 | 26 | 26 | 52 | | | | 1 |
| 000 0 1110 | 52 | 52 | 26 | 52 | 26 | 26 | | | | 1 |
| 000 0 1111 | 52 | 52 | 26 | 52 | 52 | | | | | 1 |
| 000 1 xxxx | Definition TBD | | | | | | | | | 16 |
| 00100 yyy | 26 | 26 | 26 | 26 | 26 | 106 | | | | 8 |
| 00101 yyy | 26 | 26 | 52 | 26 | 106 | | | | | 8 |
| 00110 yyy | 52 | 26 | 26 | 26 | 106 | | | | | 8 |
| 00111 yyy | 52 | 52 | 26 | 106 | | | | | | 8 |
| 01000 yyy | 106 | 26 | 26 | 26 | 26 | 26 | | | | 8 |
| 01001 yyy | 106 | 26 | 26 | 26 | 52 | | | | | 8 |
| 01010 yyy | 106 | 26 | 52 | 26 | 26 | | | | | 8 |
| 01011 yyy | 106 | 26 | 52 | 52 | | | | | | 8 |
| 011 xxxxx | Definition TBD | | | | | | | | | 32 |
| 10 yyy yyy | 106 | 26 | 106 | | | | | | | 64 |
| 11 0 00yyy | 242 | | | | | | | | | 8 |
| 11 0 01yyy | 484 | | | | | | | | | 8 |
| 11 0 10yyy | 996 | | | | | | | | | 8 |
| 11 0 11yyy | 2*996 | | | | | | | | | 8 |
| 11 1 xxxxx | Definition TBD | | | | | | | | | 32 |

FIG. 8

FIG. 9A  HE-SIG-B Structure (Common | User Specific)
FIG. 9B  Exemplary RU Allocation: 000 0 0011; [26 26 26 26 26 52 52]
User 1: 26 | Silenced RU 26 | User 2: 26 | User 3: 26 | User 4: 26 | User 5: 52 | User 6: 52
FIG. 9C  HE-SIG-B Encoding for exemplary RU allocation
Common bits + CRC + Tail | User 1 | Silence Signal | User 2 | User 3 | User 4 | User 5 | Silence Signal | Padding
901 Second RU silenced
902 Seventh RU silenced
User Specific Coding Group | User Specific Coding Group

| Storage Bucket | 1 | 2 | 3 | 4 | 5 | 6 | 7 | 8 | 9 |
|---|---|---|---|---|---|---|---|---|---|
| | RU1 | RU2 | RU3 | RU4 | | RU6 | RU7 | RU8 | RU9 |
| | RU10 | | RU11 | | RU5 | RU12 | | RU13 | |
| | RU14 | | | | | RU15 | | | |
| | RU16 | | | | | | | | |

FIG. 11

CLASSIFICATION AND SILENCING FOR UPLINK MULTI-USER TRANSMISSIONS IN WLANS

CROSS REFERENCE TO RELATED APPLICATIONS

This application is the U.S. National Stage, under 35 U.S.C. § 371, of International Application No. PCT/US2017/021487 filed Mar. 9, 2017, which claims the benefit of U.S. Provisional Application No. 62/307,143, filed on Mar. 11, 2016, the contents of which are hereby incorporated by reference herein.

BACKGROUND

In some Institute of Electrical and Electronics Engineers (IEEE) 802.11 infrastructure modes of operation, an access point (AP) transmits a beacon on a fixed channel called the primary channel. This channel is the operating channel of the BSS. This channel is also used by the stations (e.g. Wireless/Wired Transmit/Receive Units (WTRUs)) to establish a connection with the AP. The fundamental channel access mechanism in an 802.11 system is Carrier Sense Multiple Access with Collision Avoidance (CSMA/CA). In this mode of operation, every WTRU, as well as the AP, will sense the primary channel. If the channel is detected to be busy, the WTRU backs off. Hence only one WTRU may transmit at any given time in such a configuration. In other 802.11 infrastructure modes of operation there may be downlink multi-user multiple-input and multiple-output (MU-MIMO) transmission to multiple WTRUs in the same symbol time frame. The WTRUs involved in MU-MIMO transmission with the AP must use the same channel or band, which may limit the operating bandwidth to the smallest channel bandwidth that is supported by the WTRUs which are included in the MU-MIMO transmission with the AP. Additionally, WTRUs in a MU-MIMO scheme may belong to different transmit power classes, may have different processing capabilities, and may have timing offsets, which may result in poor uplink MU transmission. Classification configuration, silencing protocols, timing synchronization, and trigger padding for Uplink Multi-User transmissions may address shortcomings of existing 802.11 modes of operation.

SUMMARY

Various embodiments are provided herein which relate to methods, apparatuses and systems for multi-user (MU) transmission. One or more methods may include scheduling, by an access point (AP), an uplink (UL) MU transmission for a group of wireless transmit/receive units (WTRUs) according to transmit power classes of the WTRUs, and receiving, by a WTRU, a trigger frame that includes an indication of which class of WTRU selected from at least one of class A and class B is permitted for the UL MU transmission. The method may further include calibrating, by the AP, a transmission power of allowed WTRUs of the group of WTRUs. The method may further include scheduling, by the AP, the UL MU transmission for the group of WTRUs such that packets from the group of WTRUs arrive at the AP simultaneously. The AP may also transmit to the WTRUs an indication that at least one resource unit (RU) of a plurality of RUs is silenced.

BRIEF DESCRIPTION OF THE DRAWINGS

A more detailed understanding may be had from the following description, given by way of example in conjunction with the accompanying drawings wherein:

FIG. 6A illustrates a diagram as an example of transmission power (TxPwr) pre-correction signaling for class A and class B WTRUs according to one or more embodiments;

FIG. 6B illustrates a diagram as an example of transmission power (TxPwr) pre-correction signaling for class A and class B WTRUs according to one or more embodiments;

FIG. 6C illustrates a diagram as an example of transmission power (TxPwr) pre-correction signaling for class A and class B WTRUs according to one or more embodiments;

FIG. 6D illustrates a diagram as an example of transmission power (TxPwr) pre-correction signaling for class A and class B WTRUs according to one or more embodiments;

FIG. 6E illustrates a diagram as an example of transmission power (TxPwr) pre-correction signaling for class A and class B WTRUs according to one or more embodiments;

FIG. 8 illustrates an example resource unit (RU) allocation table according to one or more embodiments;

FIG. 9A illustrates a diagram as an example HE-SIG-B encoding for RU silencing according to one or more embodiments;

FIG. 9B illustrates a diagram as an example HE-SIG-B encoding for RU silencing according to one or more embodiments;

FIG. 9C illustrates a diagram as an example HE-SIG-B encoding for RU silencing according to one or more embodiments;

FIG. 11 is example table of a RU allocation according to one or more embodiments;

DETAILED DESCRIPTION

Figure 1A:
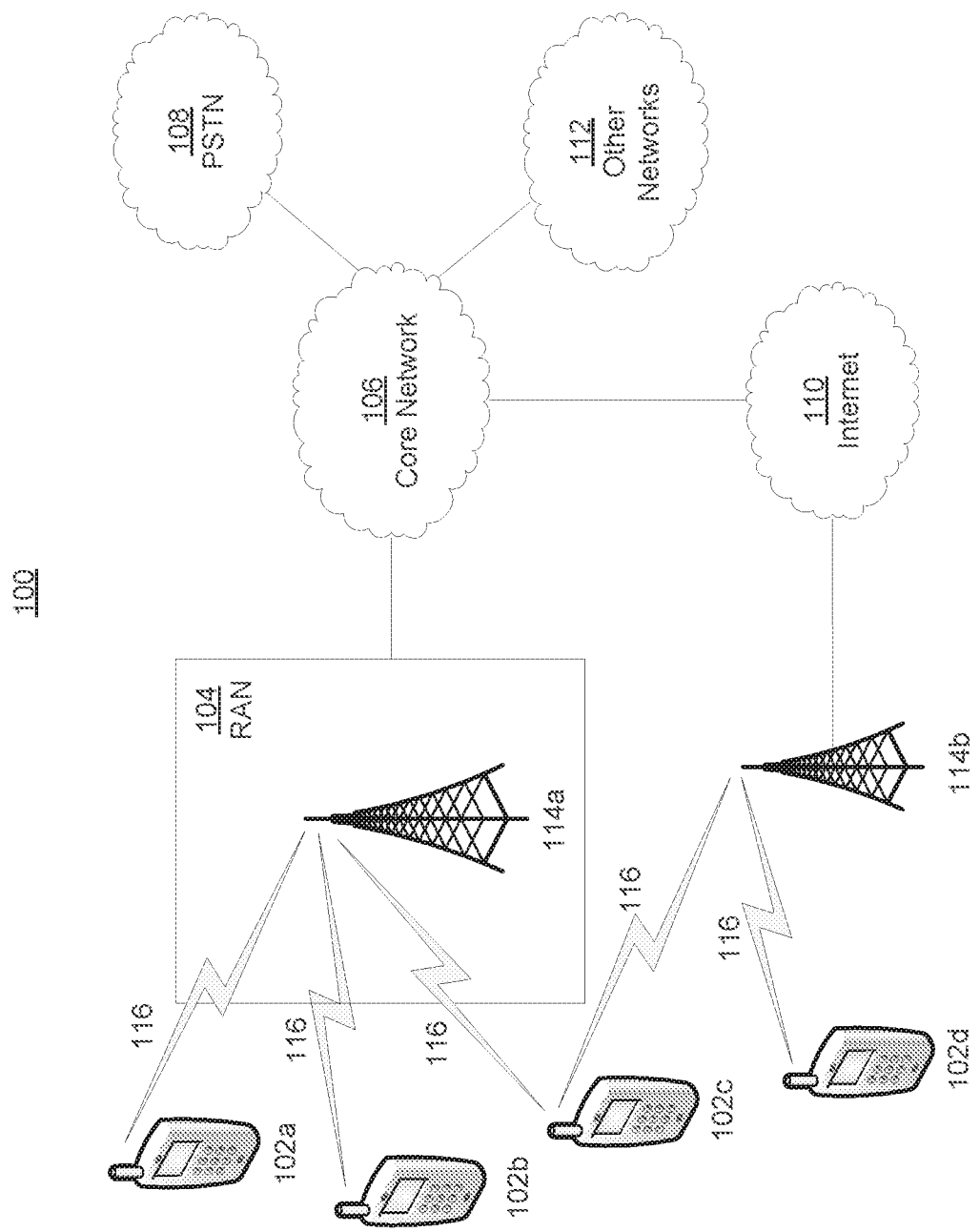
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless/wired transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wired or wireless environment. By way of example, the WTRUs 102a, 102b, 102c, 102d may be configured to transmit and/or receive wireless signals and may include user equipment (UE), a mobile station (STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. Additionally, the WTRUs 102a, 102b, 102c, 102d may communicate with the access points (APs) 170a and 170b. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In other embodiments, the base station 114a and the WTRUs 102a, 102b, 102c may implement radio technologies such as 5G, Wi-Gig, New Radio, Low Latency Machine to Machine communication, and other related technologies.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, a road, an intersection, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
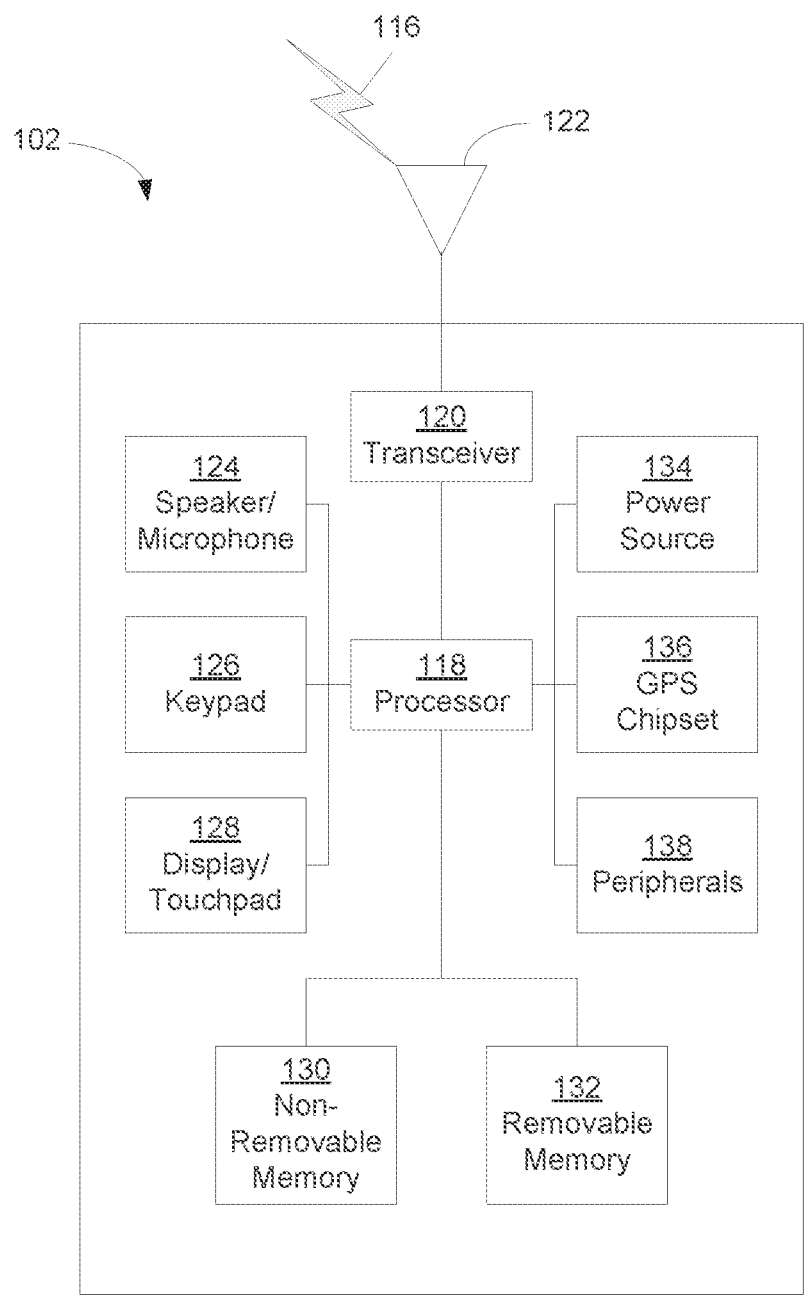
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
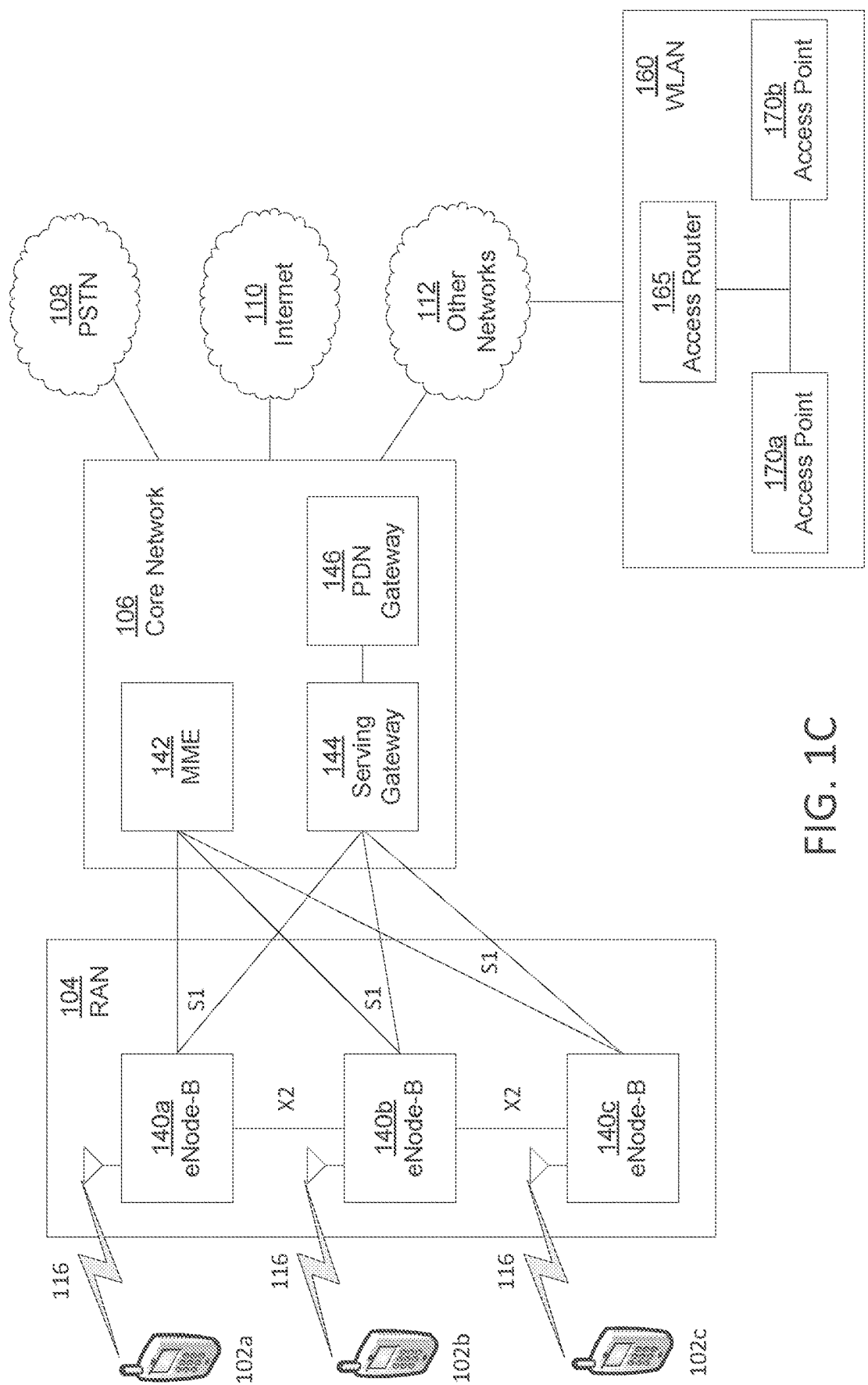
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, and 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Figure 2:
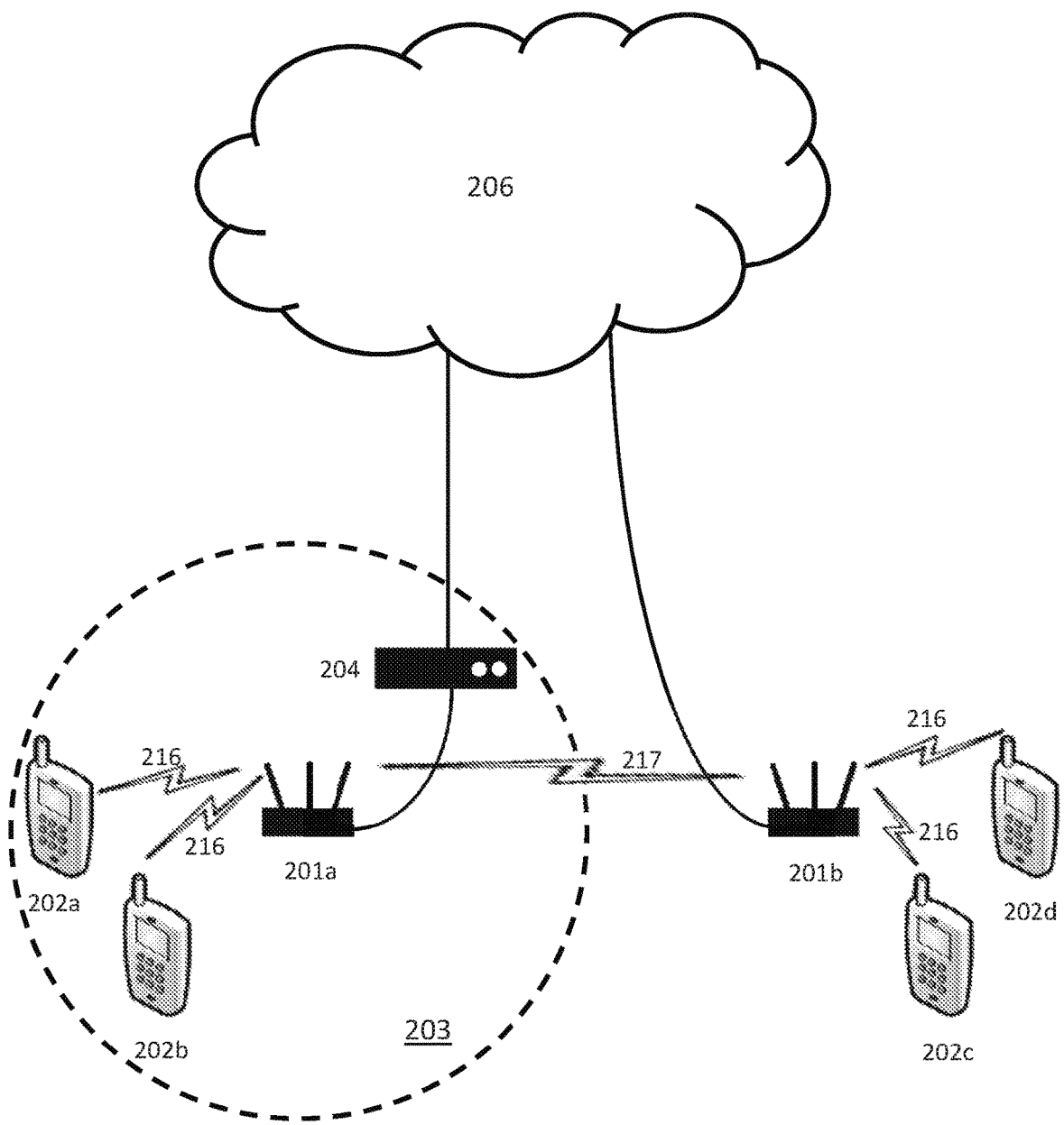
FIG. 2 is a system diagram of an example communications system in which one or more disclosed embodiments may be implemented.

FIG. 2 is a diagram of an example communications system 200 in which one or more disclosed embodiments may be implemented. FIG. 2 shows an example of a communication system 200 with a Wireless Local Area Network (WLAN) in Infrastructure Basic Service Set (BSS) 203 mode with an Access Point (AP) 201a for the BSS 203 and one or more WTRUs 202a and 202b associated with the AP 201a via wireless interface 216. The APs 201a and 201b may also be connected to WTRUs via a wired interface (not shown). The APs 201a or 202b typically have access or interface to a Distribution System (DS) or another type of wired/wireless network that carries traffic in and out of the BSS. The APs may perform the functions of a base station, a gateway, a modem, an Information Centric Network gateway or access point, a Content Centric Network gateway or access point, a Software Defined Network gateway or access point, a source of traffic, or other network function. The DS functions may by facilitated by an AP 201b with a built in modem that has connection to a network 206, such as the internet, or an AP 201a may gain access to a network through a modem 204. The network 206 may be the Internet or other network that facilitates connections to other networks or sources/devices. Traffic to WTRUs 202a and 202b that originates from outside the BSS arrives through the AP 201a. Traffic originating from WTRUs 202a and 202b to destinations outside the BSS 203 is sent to the AP 201a to be sent to the respective destinations. Traffic between WTRUs 202a and 202b within the BSS 203 may also be sent through the AP 201a where the source WTRU 202a sends traffic to the AP 201a and the AP 201a delivers the traffic to the destination WTRU 202b. Such traffic between WTRUs 202a and 202b within a BSS 203 may be similar peer-to-peer traffic. Traffic between WTRUs 202a and 202b may also be sent directly between the source WTRU 202a and destination WTRU 202b with a direct link setup (DLS) using an 802.11e DLS or an 802.11z tunneled DLS (TDLS). A WLAN in Independent BSS (IBSS) mode may not have an AP and WTRUs communicate directly with each other. This mode of communication may be referred to as "ad-hoc" mode of communication. In another embodiment APs 201a and 202b may communicate over a wireless interface 217 or through a wired connection.

In some 802.11 infrastructure modes of operation, the AP may transmit a beacon on a fixed channel called the primary channel. This channel may be 20 MHz wide and may be the operating channel of the BSS. This channel may also be used by the WTRUs to establish a connection with the AP. The fundamental channel access mechanism in an 802.11 system may be a Carrier Sense Multiple Access with Collision Avoidance (CSMA/CA). In this mode of operation, every WTRU, including the AP, may sense the primary channel. If the channel is detected to be busy, a WTRU may back off. Hence only one WTRU may transmit at any given time in a given BSS of such a configuration.

For reference, 802.11n and 802.11ac may operate in the frequencies from 2 to 6 GHz. In 802.11n, High Throughput (HT) WTRUs may use a 40 MHz wide channel for communication. This may be achieved by combining a primary 20 MHz channel with another adjacent 20 MHz channel to form a 40 MHz wide channel. In 802.11ac, Very High Throughput (VHT) WTRUs may support 20 MHz, 40 MHz, 80 MHz and 160 MHz wide channels. While 40 MHz and 80 MHz channels may be formed by combining contiguous 20 MHz channels similar to the example above, 160 MHz channel may be formed either by combining 8 contiguous 20 MHz channels or two non-contiguous 80 MHz channels (80+80 configuration).

As an example for the "80+80" configuration, the data, after channel encoding, is passed through a segment parser that divides it into two streams. IFFT and time domain processing are done on each stream separately. The streams may then be mapped on to the two channels and the data sent out. On the receiving end, this mechanism may be reversed and the combined data is sent to the MAC.

Also the Short Interframe Space (SIFS) for Request-to Send (RTS)-Clear-to-Send (CTS) (i.e., the RTS-CTS SIFS) may be 16 μs and the guard interval (GI) may be 0.8 μs. Transmissions from nodes within 100 m may remain within the GI, but beyond 100 m, the delay may be longer than 0.8 μs. At 1 km, the delay may be over 6 μs.

IEEE 802.11af and IEEE 802.11ah may operate in frequencies that are less than 1 GHz. For 802.11af and 802.11ah the channel operating bandwidths may be reduced as compared to 802.11n and 802.11ac. 802.11af may support 5 MHz, 10 MHz and 20 MHz wide bands in TV White Space (TVWS) while 802.11ah may supports 1 MHz, 2 MHz, 4 MHz, 8 MHz and 16 MHz in non-TVWS. In some embodiments, WTRUs used in 802.11ah may be sensors with limited capabilities and may only support 1 and 2 MHz transmission modes.

In the WLAN systems that utilize multiple channel widths such as IEEE 802.11n, 802.11ac, 802.11af, and 802.11ah, there may be a primary channel that may have a bandwidth equal to the largest common operating bandwidth supported by all WTRUs in the BSS. The bandwidth of the primary channel may therefore be limited by the WTRU that supports the smallest bandwidth operating mode. In the example of 802.11ah, the primary channel may be 1 or 2 MHz wide if there are WTRUs that only support 1 and 2 MHz modes, while the AP and other WTRUs in the BSS may support 4 MHz, 8 MHz and 16 MHz operating modes. All carrier sensing, and NAV settings, may depend on the status on the primary channel. For example, if the primary channel is busy due to a WTRU supporting only 1 and 2 MHz operating modes transmitting to the AP, then the entire available frequency bands may be considered busy even though a majority of it stays idle and available. In 802.11ah and 802.11af, all packets may be transmitted using a clock that is down clocked 4 or 10 times as compared to the 802.11ac specification.

In the United States, the available frequency bands that may be used by 802.11ah may range from 902 MHz to 928 MHz; in Korea, it may be from 917.5 MHz to 923.5 MHz; in Japan, it may be from 916.5 MHz to 927.5 MHz. Thus, the total bandwidth available for 802.11ah may be 6 MHz to 26 MHz depending on the country code.

To improve spectral efficiency 802.11ac may use the concept of downlink Multi-User MIMO (MU-MIMO) transmission to multiple WTRUs in the same symbol time frame, e.g. during a downlink Orthogonal Frequency Division Multiplexing (OFDM) symbol. Interference of waveform transmissions to multiple WTRUs in 802.11ac MU-MIMO may not be an issue because the same symbol timing is used for multiple WTRUs. However, all WTRUs involved in 802.11ac MU-MIMO transmission with the AP must use the same channel or band which may limit the operating bandwidth to the smallest channel bandwidth that is supported by the WTRUs which are included in the MU-MIMO transmission with the AP. Downlink MU-MIMO may also be used with 802.11ah.

As noted above, 802.11ac may form channels by combing up to eight contiguous 20 MHz channels, or two non-contiguous 80 MHz channels. The transmission procedure in 802.11ac may assume the use of the entire allocated bandwidth for transmission and reception. In comparison, IEEE 802.11ax may enhance the performance of 802.11ac; in particular it may address spectral efficiency, area throughput, and robustness to collisions and interference. One method that may be used to address the performance of 802.11ac may be orthogonal frequency division multiple access (OFDMA). Backward compatibility issues may be considered when applying OFDMA to Wi-Fi standards, such as 802.11ac. Coordinated Orthogonal Block-based Resource Allocation (COBRA) may introduce OFDMA methods to address Wi-Fi backward compatibility and channel based resource scheduling. For example, COBRA may enable transmissions over multiple smaller frequency-time resource units. Thus, multiple WTRUs may be allocated to non-overlapping frequency-time resource unit(s), and may be enabled to transmit and receive simultaneously. A sub-channel may be defined as a basic frequency resource unit that an AP may allocate to a WTRU. For example, in instances of backward compatibility with 802.11n/ac, a sub-channel may be defined as a 20 MHz channel.

COBRA may include multicarrier modulation, filtering, time, frequency, space, and polarization domains as the basis for the transmission and coding scheme.

A COBRA scheme may be implemented using at least one of OFDMA Subchannelization, Single-carrier frequency-division multiple access (SC-FDMA) Subchannelization, and/or Filter-Bank Multicarrier Subchannelization.

In order to enable COBRA transmissions, the following features may be introduced: methods for coverage range extension, methods of grouping users, methods for channel access, preamble designs for low overhead, methods for beamforming and sounding, methods for frequency and timing synchronization, and methods for link adaptation.

Multi-User Parallel channel access (MU-PCA) and Single User Parallel Channel Access (SU-PCA) schemes may also be contemplated. MU-PCA may address several additional methods to those introduced with COBRA including: multi-user/Single-User parallel channel access using transmit/receive with symmetrical bandwidth and multi-user/single-User PCA transmit/receive with asymmetrical bandwidth.

Considerations for multi-user/single-user PCA using transmit/receive with symmetrical bandwidth may include: down-link parallel channel access for multiple/single user(s), up-link parallel channel access for multiple/single user(s), combined down-link and up-link PCA for multiple/single user(s), design to support unequal Modulation and Coding Scheme (MCS) and unequal transmit power for SU-PCA and COBRA, PHY layer designs and procedures to support multi-user/single-user parallel channel access using transmit/receive with symmetrical bandwidth, and mixed MAC/PHY layer MU-PCA.

Considerations for multi-user/single-user PCA transmit/receive with asymmetrical bandwidth may include MAC layer designs and procedures for downlink, uplink and combined uplink and downlink for multi-user/single-user parallel channel access using transmit/receive with asymmetrical bandwidth, and PHY layer designs and procedures to support multi-user/single-user parallel channel access using transmit/receive with asymmetrical bandwidth.

Figure 3:
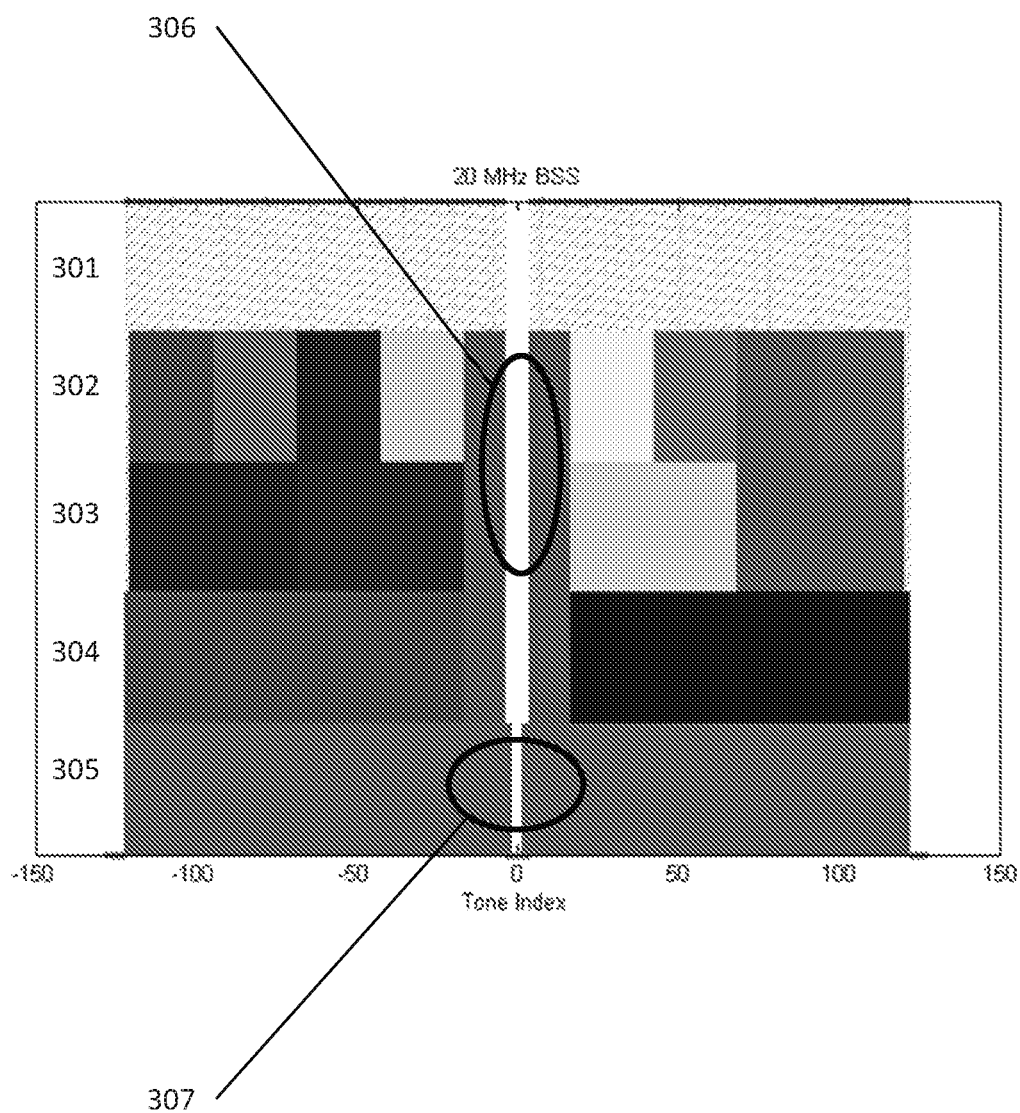
FIG. 3 illustrates a diagram as an example 20 MHz tone plan according to one or more embodiments.

FIG. 3 shows an example of a 20 MHz tone plan which may be used for uplink (UL) multi-user operation. In 802.11ax, an uplink multi-user physical layer convergence procedure (PLCP) protocol data unit (PPDU) may be defined for MU-MIMO or OFDMA. This PPDU is sent as a response to a trigger frame sent by the AP. The trigger frame allocates different WTRUs to different resources (in the case of OFDMA a specific Resource Unit). In the example of FIG. 3 where a BSS consists of a 20 MHz channel, the 802.11ax Specification Framework Document (SFD) proposes the following OFDMA building blocks as follows: the row at 301 represents the usable tones, row 302 represents 26-tone RUs with 4 leftover tones to be determined, row 303 represents 52 tone RUs plus one 26 tone RU with 4 leftover tones to be determined, row 204 represents 106 tone RUs plus one 26 tone, and row 305 represents 242 tone RU non OFDMA. The example shown in FIG. also shows 306 which represents 7 DC Nulls and 307 which represents 3 DC Nulls. Similar building blocks may be defined for 40 MHz, 80 MHz, 160 MHz and 80+80 MHz.

In one embodiment, the 802.11ax standard for class A and class B devices may have requirements for uplink multi-user transmission. A requirement for Transmission (Tx) power control may be: required minimum Tx power is max(P-32, -10) dBm with TxEVM for at least MCS 7 supported. A requirement for RSSI measurement accuracy may be: class A (Tx power: +/−3 dB, RSSI measurement: +/−2 dB), and class B (Tx power: +/−9 dB, RSSI measurement: +/−5 dB). A requirement for Carrier Frequency Offset (CFO) may be: 350 Hz in AWGM with Rx over @−60 dBm. A requirement for Timing may be: +/−0.4 usec relative to trigger frame. A requirement for Local Oscillator (LO) Leakage may be: Power measured at the location of the RF LO using resolution BW 78.125 kHz is max(P-32,-20). A requirement for Sampling Frequency Offset may be: center frequency and symbol clock frequency derived from same reference oscillator. These requirements may have implications for the UL MU mechanisms defined in standards related to 802.11.

In a situation arising from a communication system, such as that described with relation to FIG. 2, there may be uplink transmissions for which WTRUs with different power classes (e.g., class A and class B devices) are involved in a MU scheme. In such a situation, frequency errors due to timing misalignments, Doppler, oscillators, etc., may result in some inter carrier interference (ICI) between resource units (RUs) for a UL MU transmission. With loss of orthogonality, significant interference from stronger signals to weaker signals may occur. To address this interference, one approach may be to pre-correct the power from the WTRUs to ensure that power is roughly the same at the AP. Pre-correction may compensate for the different arrival power of the WTRUs due to location, energy, etc. In some instances arrival power differences may be within 10 dB for RU=26 and 64 QAM for limited multi-user interference from ICI as higher differences may not be tolerated. Further, power differences between uplink clients may be about 6 dB for the highest rates and much more for lower rates. Results for UL MIMO with 312.5 kHz inter carrier spacing, however, Task Group ax (TGax) may be more sensitive for UL MU OFDMA with 78.1 kHz inter carrier spacing.

In pre-correction there may be two WTRU transmit power classes, class A and class B, that support high efficiency (HE) trigger-based PPDUs with information exchanged as part of the device capability. Class A may include WTRUs that are high capability devices and class B may include WTRUs that are low capability devices.

A WTRU that transmits an HE trigger-based PPDU may support the absolute transmit power requirements and the received signal strength indicator (RSSI) measurement accuracy requirements for the two device classes. From the parameters for absolute transmit power accuracy, class B may have a difference of 18 dB while class A may have a difference of 6 dB. The overall arrival power may have a greater mismatch when coupled with the RSSI measurement accuracy which ranges over 10 dB for class B WTRUs and 4 dB for class A WTRUs.

In scenarios where there are a mixture of class A and class B devices, the different requirements may result in poor uplink MU transmission. Methods may be considered to ensure WTRUs that belong to different power classes are able to participate in an uplink multi-user transmission.

According to one or more embodiments, an UL MU transmission may be restricted to specific WTRU classes. For example, WTRUs of different classes may be restricted from transmitting simultaneously. As such, a class A device shall not be scheduled with a class B device in the same UL transmission.

For a Random Access (RA) uplink transmission, the class of devices allowed may be signaled in the trigger frame. In addition, the transmit power used by the AP and the desired target receive power at the AP may also be signaled in the trigger frame to allow the RA WTRUs to estimate the transmit power to use based on the target receive power at the AP.

In one embodiment, WTRUs of different classes may be scheduled together (or allowed to access resources in a random access manner) without any restriction.

In another embodiment, WTRUs of different classes may be scheduled together without any restriction, but WTRUs that are allowed to access resources in a random access manner are restricted to a specific class.

Figure 4:
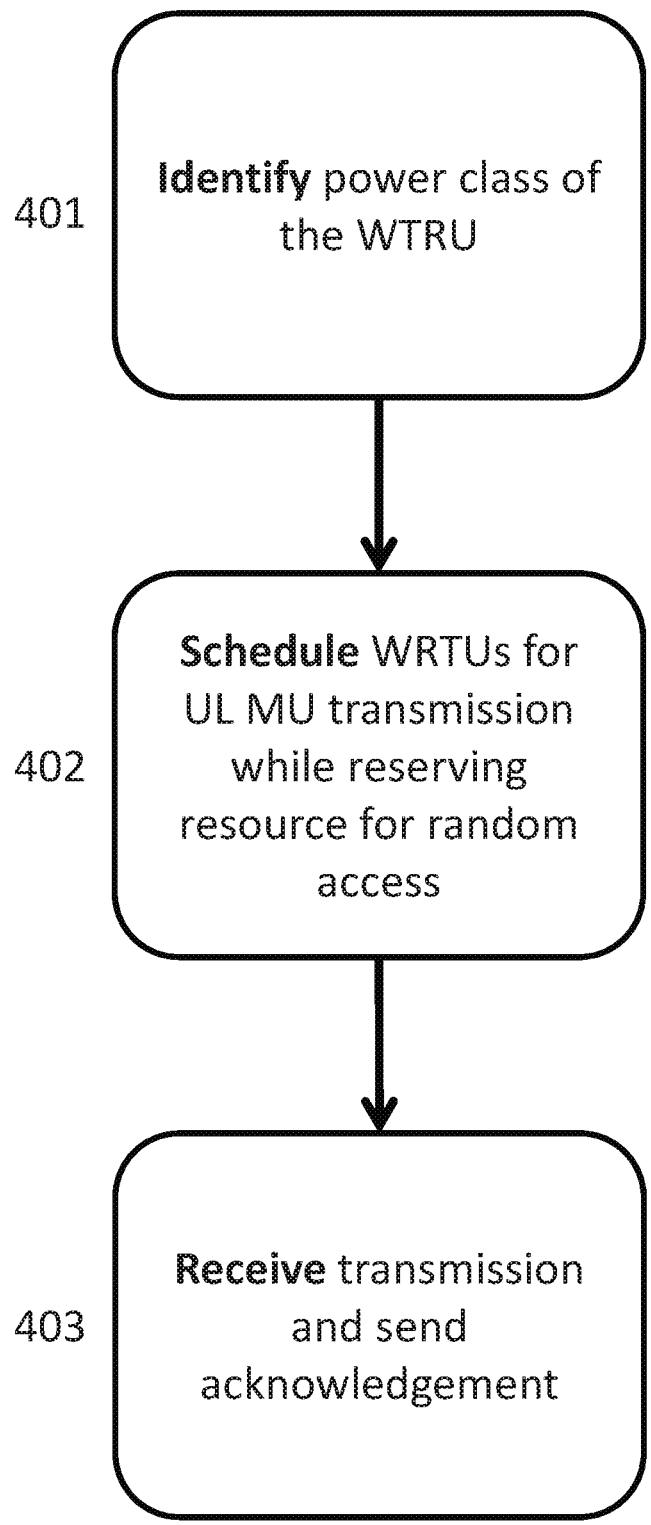
FIG. 4 is an example process of Uplink Transmission for WTRUs with different power classes according to one or more embodiments.

FIG. 4 shows an example of a procedure that may be used for the restriction of an UL MU transmission to specific WTRU classes. An AP may identify 401 the power class of the WTRUs based on the WTRUs capability. In one example, assume that WTRU 1, WTRU 2, WTRU 3 and WTRU 4 are class A WTRUs, while WTRU 5, WTRU 6, WTRU 7 and WTRU 8 are class B WTRUs. According to the identified power classes of the WTRUs, the AP may schedule 402 the WTRUs for a transmission and may reserve some resources for random access. At 403, the AP may receive the transmissions and then transmit acknowledgements of the transmission back to the WTRUs.

Figure 5:
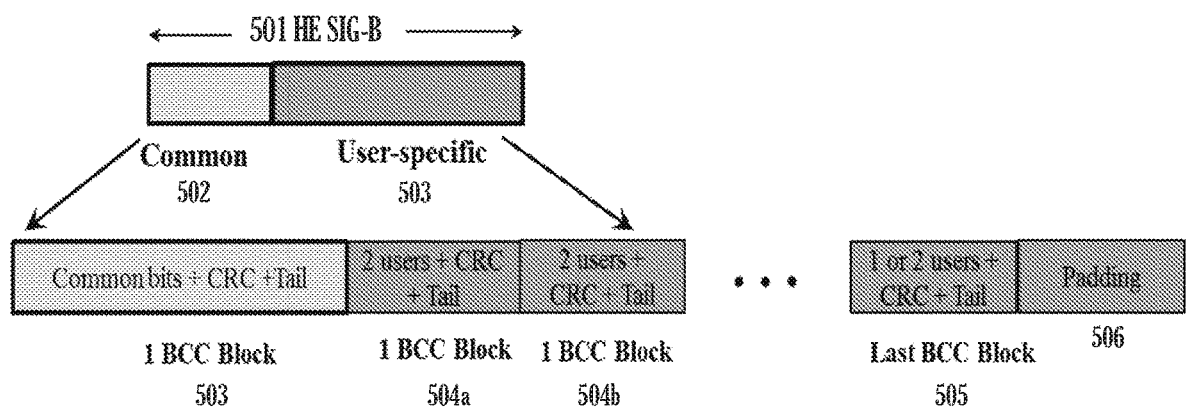
FIG. 5 is a diagram of an example a high efficiency (HE)-SIG-B structure according to one or more embodiments.

FIG. 5 illustrates an example of an HE-SIG-B field structure for 802.11ax. The HE-SIG-B field 501 may contain common and user-specific elements or subfields. In the common subfield 502, an 8-bit field may indicate the RU allocation in the frequency domain, the RUs allocated for MU-MIMO, and the number of users allocated. The user-specific subfield may follow the common subfield with per user dedicated information. The common subfield 502 may include one binary convolutional coding (BCC) block 503 which includes common bits. The user-specific subfields 503 may include multiple BCC blocks each with per user dedicated information for a number of users, a Cyclic Redundancy Check (CRC), and a tail as shown at 504a, 504b, and 505. The user-specific subfield 503 may also include a padding block at the end.

FIGS. 6A-6E show examples of signaling that relate to the transmission power for pre-correction signaling in class A and B WTRUs. FIG. 6A shows one example configuration where the AP only allows class A WTRUs to transmit, the AP may schedule WTRU 1 and WTRU 2 for UL MU transmission (i.e., class A WTRUs), while reserving a resource for random access. The AP may then transmit a trigger frame with the resource information. Here, the trigger frame may indicate the resources allocated for WTRU 1 and WTRU 2, the resources allocated for random access, and/or the class of WTRUs allowed for random access (e.g., WTRU 3 and WTRU 4). If the scheduling is for class A WTRUs only, the Transmitter Power Control (TPC) parameter may be signaled in the common HE-SIG-B field. This is referred to as common TPC signaling. The example configuration may only allow UL MU transmission for class A WTRUs, and disallow UL MU transmission for class B WTRUs.

FIGS. 6B and 6C show example configurations where the AP only allows class B WTRUs to transmit, the AP may schedule WTRU 5 and WTRU 6 for UL MU transmission (i.e., class B WTRUs), while reserving a resource for random access. Here, the trigger frame may indicate the resources allocated for WTRU 5 and WTRU 6, the resources allocated for random access, and the class of WTRUs allowed for random access (e.g., WTRU 7 and WTRU 8). If class B WTRUs are scheduled, the TPC parameters may be sent separately to each user in a manner that compensates for the Tx power and RSSI measurement accuracy/inaccuracy of that specific user in each user specific HE-SIG-B field. For example, the AP may further need to perform a calibration to estimate the compensation needed for each WTRU. In an additional/alternative signaling option, the common TPC parameter may be sent in the common HE-SIG-B field and may be used to indicate target receive power required by the AP while the user specific TPC parameter is sent in each user specific HE-SIG-B field to compensate for the additional variability in measurement. Additionally or alternatively, a signaling option may have only user specific TPC parameters sent in each user specific HE-SIG-B field to identify the target receive power and compensate for the additional variability in measurement.

FIGS. 6D and 6E show example configurations where both class A and class B WTRUs are allowed to transmit, and the AP may schedule WTRU 1 and WTRU 2, WTRU 5 and WTRU 6 for UL MU transmission (i.e., class A and class B WTRUs), while reserving a resource for random access. Here, the trigger frame may indicate the resources allocated for WTRU 1, WTRU 2, WTRU 5 and WTRU 6, the resources allocated for random access, and the class of WTRUs allowed for random access (WTRU 3, WTRU 4, WTRU 7 and WTRU 8). If both class A and class B WTRUs are scheduled, the TPC parameters may be sent separately to each user in a manner that accounts for the variability of that specific user in each user specific HE-SIG-B field. The AP may need to perform a calibration to estimate the compensation needed for each class B WTRU; the calibration for class B WTRUs may not preclude the AP from calibrating the class A WTRUs. In addition or alternatively, in one signaling option, the common TPC parameter may be sent in the common HE-SIG-B field and used to indicate target receive power required by the AP while the user specific TPC parameter is sent in each user specific HE-SIG-B field to compensate for the additional variability in measurement for both class A and class B WTRUs. In another signaling option, the common TPC parameter may be sent in the common HE-SIG-B field and used to indicate target receive power required by the AP while the user specific TPC parameter may be sent in each user specific HE-SIG-B field to compensate for the additional variability in measurement for class B WTRUs only. In another signaling option, user specific TPC parameters may be sent in each user specific HE-SIG-B field to identify the target receive power (for both class A and B WTRUs) and to compensate for the additional variability in measurement (for both class A and B WTRUs or for class B WTRUs only).

In the example where class A WTRUs are allowed only, once the AP schedules the WTRUs to be transmitted, transmits the trigger frame, and WTRU 1 through WTRU 8 receive the trigger frame, WTRU 1 through WTRU 4 may perform a clear channel assessment (CCA) on the channel if channel sensing is required. When the CCAs are clear, WTRU 1 and WTRU 2 may transmit on their assigned resource and WTRU 3 and WTRU 4 may compete for the random access resources where the WTRU that wins transmits on the resource. In such an example, WTRU 5 through WTRU 8 would not transmit during this transmission opportunity (TxOP).

In the example where only class B WTRUs are allowed, once the AP schedules the WTRUs for transmission, transmits the trigger frame, and WTRU 1 through WTRU 8 receive the trigger frame, WTRU 5 through WTRU 8 may perform a CCA on the channel if channel sensing is required. When the CCAs are clear, WTRU 5 and WTRU 6 may transmit on their assigned resource and WTRU 7 and WTRU 8 may compete for the random access resources where the WTRU that wins transmits on the resource. In such an example, WTRU 1 through WTRU 4 would not transmit during this TxOP.

In the example where both class A and class B WTRUs are allowed, once the AP schedules the WTRUs for transmission, the AP transmits the trigger frame, and WTRU 1 through WTRU 8 receive the trigger frame, then WTRU 1 through WTRU 8 may perform CCA on the channel if channel sensing is required. When the CCAs are clear, WTRU 1, WTRU 2, WTRU 5 and WTRU 6 may transmit on their assigned resource and WTRU 3, WTRU 4, WTRU 7 and WTRU 8 may compete for the random access resource where the WTRU that wins transmits on the resource.

After the WTRUs process the trigger frame, the AP may receive the transmission(s) from the corresponding WTRUs and then transmit an acknowledgement to the corresponding WTRUs.

Another or alternative embodiment may address UL MU transmissions with different power levels by having the AP perform a calibration to estimate the compensation needed for each WTRU. Further, the AP may calibrate the WTRUs and estimate a transmit power pre-correction factor that may be used when scheduling a specific WTRU. The pre-correction factor may be signaled by the trigger frame. This allows class A and class B WTRUs to be scheduled in the same UL MU transmission or for class B WTRUs to be transmitted alone.

Figure 7:
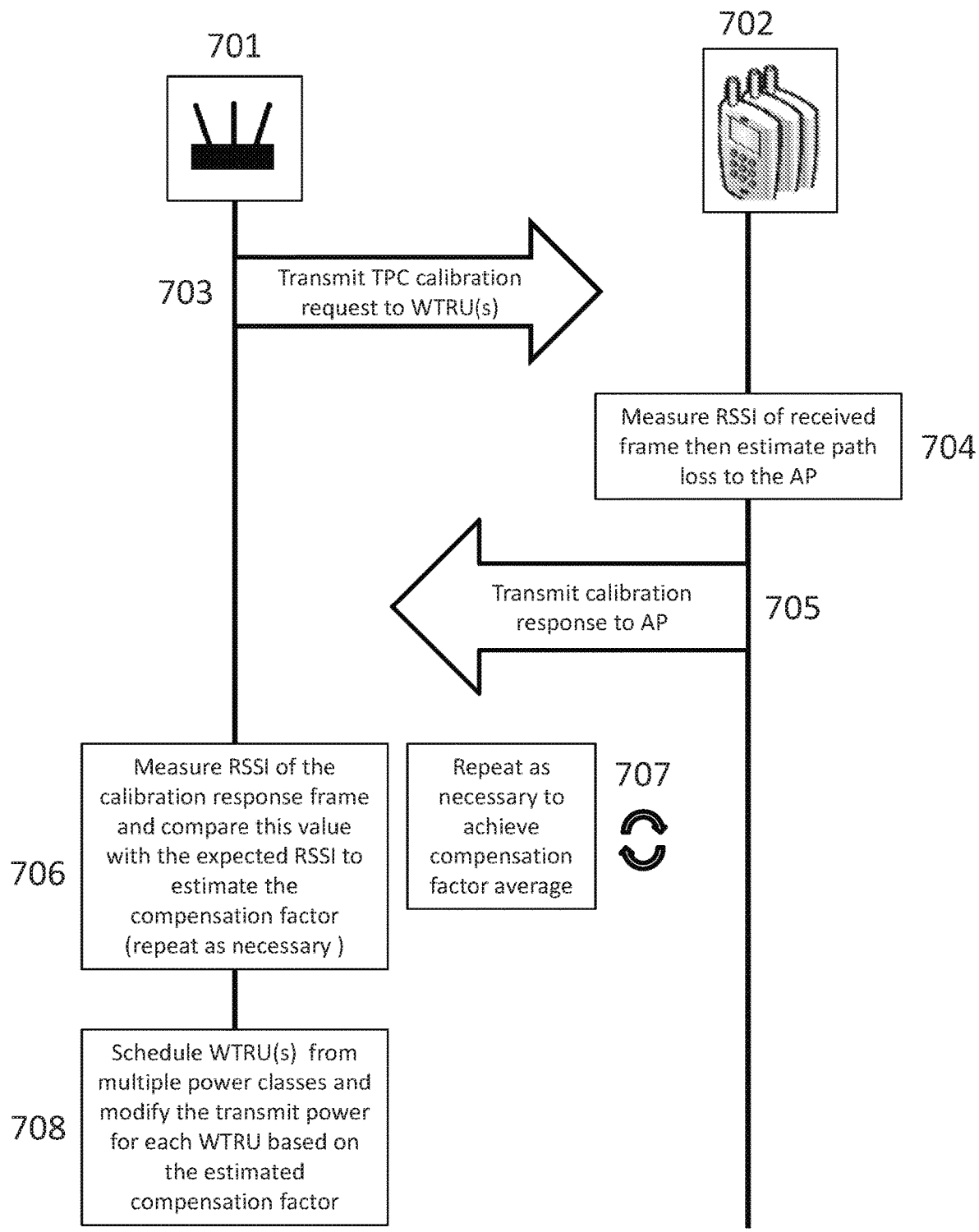
FIG. 7 is an example process of Uplink Transmission for WTRUs with different power classes according to one or more embodiments.

FIG. 7 shows an example procedure for calibration. At 703, the AP 701 may transmit a TPC calibration request or calibration frame to a WTRU or group of WTRUs 702. This request may be solicited or unsolicited (i.e., autonomous). A calibration frame may contain a transmit power used by the AP; the information may be placed as part of the beacon frame; and/or the information may be placed as part of a buffer status request.

At 704, in response to receiving the calibration frame, the WTRU(s) 702 measures the RSSI of received calibration frame and then estimates the path loss to the AP.

At 705, each WTRU of the one or more WTRU(s) 702 may then transmit a calibration response to the AP 701. The calibration response provided by each WTRU may include one or more of the following: the transmit power of the WTRU 702 to the AP 701, the RSSI measured by a WTRU due to a calibration frame, and the receive power at which the WTRU expects the AP 701 to receive the calibration response. The response may be sent as a dedicated calibration response frame and/or the response may be sent as part of a buffer status response.

At 706, in response to receiving the calibration response frame, the AP 701 measures the RSSI of the calibration response frame and compares this value with the expected RSSI at the AP 701. The AP 701 may estimate the compensation factor as the difference between the measured RSSI and the expected RSSI found in the calibration feedback frame. At 707, the AP 701 may optionally perform this process multiple times in iteration and average the resulting compensation factor.

At 708, the AP 701 may schedule users from multiple power classes and modify the transmit power for each user by the estimated compensation factor. Alternatively, the AP 701 may send the compensation factor to each of the WTRU(s) 702 and ask each WTRU(s) 702 to modify its estimated transmit power by the amount indicated by the compensation factor for any multi-user transmission. The compensation factor may be calculated separately for each WTRU 702 and provided to each WTRU 702 on an individual basis. Alternatively, the AP 701 may send the WTRU(s) 702 a parameter that indicates that one or more WTRU(s) 702 should increase/decrease its power by a fixed amount. This may also be provided to the WTRU(s) 702 on an individual basis. In one example, the quantized fixed amount may be one a set of increments signaled by the AP 701 (e.g., +/1 0.25 dBm, +/−0.5 dBm, +/−0.75 dBm, +/1 1 dBm).

In a situation arising from a communication system, such as that described with relation to FIG. 2, narrow band interference may arise. According to one or more embodiments, RU silencing for UL MU transmission is considered for signaling which enables an RU-blanked transmission which may avoid or mitigate interference and/or poor performance.

In one or more embodiments for RU silencing in UL MU transmission, the common subfield of the HE-SIG-B may be transmitted as usual. However, for any RU that may be silenced, the corresponding user specific HE-SIG-B may be modified to indicate to the WTRU that one or many RUs are silenced by the AP.

RU silencing may be used in at least any one of the following scenarios: in a dense network, multiple APs may coordinate to ensure that their transmissions are orthogonal to each other on a sub-20 MHz level; the AP may observe that certain RUs are prone to transmission failure based on a narrow band interference source that may not trigger CCA thresholds resulting in back-off; and/or the AP may decide to randomize the scheduling and transmission of user information as a physical layer security measure.

FIG. 8 illustrates an example table for the arrangement and number of MU-MIMO allocations for IEEE 802.11ax WTRUs. The entries indicated by "yyy" may equal any number 000 through 111 and may indicate the number of MU-MIMO WTRUs. All entries that have one or more "x" indicate bits that are to be determined by the standard. It is noted that in FIG. 8, there is no mechanism to allow for specifying empty RUs (i.e. silenced RUs). Having silenced RUs may be helpful in cases where the AP may have realized that certain RUs have poor performance and/or are experiencing interference, as described above.

FIG. 9A shows an example of a HE-SIG-B structure with a common portion and a user specific portion. In another example, FIG. 9B shows the user specific portion of FIG. 9A in greater detail. The user specific portion may have an RU allocation for at least one WTRU. In yet another example, FIG. 9C, shows the HE-SIG-B structure of 9A in greater detail for a specific scenario; specifically, FIG. 9C shows an example where the RU allocation indicates that there are seven RUs to be allocated and the second 901 and seventh 902 RUs (from the left) are to be silenced (i.e., a silence signal).

In one embodiment, the user specific HE-SIG-B subfield corresponding to the silenced RU may be set to zero. In another embodiment, to prevent a large run of zeros which may impact the coding negatively, the WTRU identification (ID) element of the user specific HE-SIG-B subfield corresponding to the silenced RU may be set to a specific pattern (e.g., zero), and the rest of the user specific subfields may be padded with dummy data; additionally or alternatively, an additional field may be added to the user specific HE-SIG-B subfield corresponding to the silenced RU to indicate that the RU is not occupied. In one embodiment, the number of space time streams (NSTS) field of the user specific HE-SIG-B subfield corresponding to the silenced RU may be set to zero.

Figure 9D:
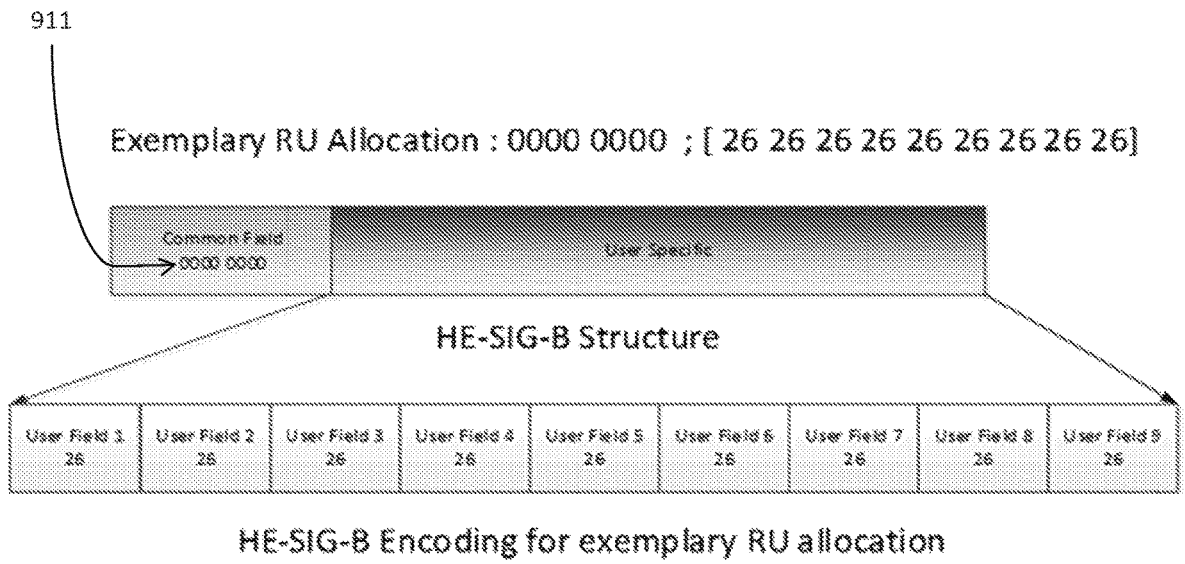
FIG. 9D illustrates a diagram as an example HE-SIG-B encoding for RU allocation with RU silencing according to one or more embodiments.

In an example, an HE-SIG-B structure as shown in FIG. 9D, unused 8 bit indices ####π #### from FIG. 8 may be used to indicate RU silencing. Table 1, for example, shows 8 bit indices from FIG. 8 that are to be determined, and may be defined to correlate to which, if any, RU is silenced; note, any system of numbering may be used to indicate which 8 bit indices combination may correlate to one or more RUs and the one provided in the table is just an example. In the example of FIG. 9D, when the newly defined 8 bit indices 0000 0000, as shown at 911, is signaled in the common field of HE-SIG-B field, the WTRU-specific field corresponding to the indicated RU silencing may not be sent so that the signaling overhead for WTRU specified field can be saved; hence, in the example of FIG. 9D all 9 RU allocations are shown without silencing. In another example shown in FIG. 9E, an 8 bit indice 0001 0010 shown at 921 may be defined to signal silencing of the second 26-tone RU for a 9 26-tone RU allocation.

Figure 9E:
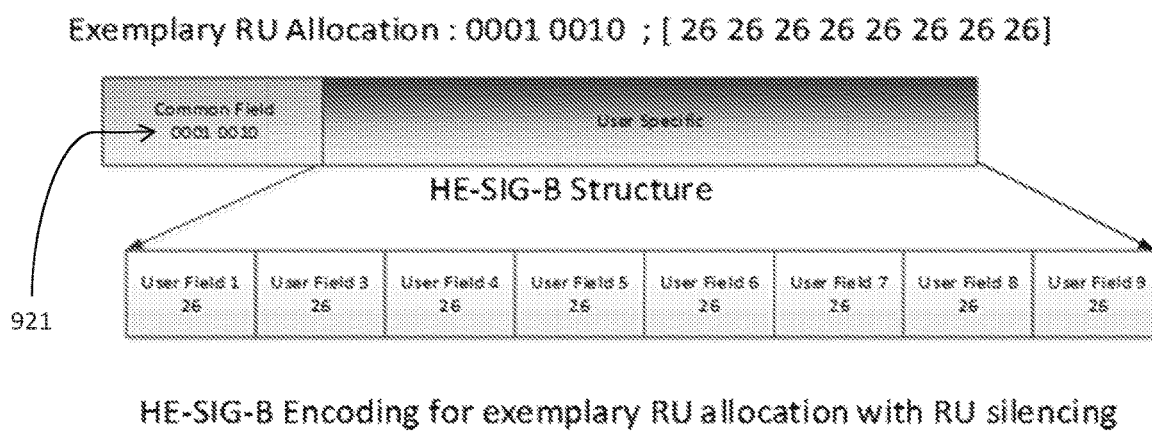
FIG. 9E illustrates a diagram as an example HE-SIG-B encoding for RU allocation with RU silencing according to one or more embodiments

In the examples of FIGS. 9D and 9E, the HE-SIG-B structure may be maintained while the RU allocation signaling in the common field is different. See 911 common field of FIG. 9D that is 00000000 compared to 921 common field of FIG. 9E that is 00010010. The 911 common field indicates a 9 26-tone RU allocation and the 921 common field indicates a 8 26-tone RU allocation with the second RU silencing in the WTRU specific fields. The mapping between the configurable RU silence configurations and unused 8 bit indices may be predefined or specified in an RU allocation signaling table, such as that shown below in Table 1. Since 16+32+32=80 unused entries are available in total, up to 80 RU silencing configurations may be supported.

TABLE 1

| 8 bit indices | #1 | #2 | #3 | #4 | #5 | #6 | #7 | #8 | #9 | Number of entries |
|---|---|---|---|---|---|---|---|---|---|---|
| 000 1xxxx | | | Definition TBD | | | | | | | 16 |
| 011 xxxxx | | | Definition TBD | | | | | | | 32 |
| 11 1 xxxxx | | | Definition TBD | | | | | | | 32 |

Figure 10:
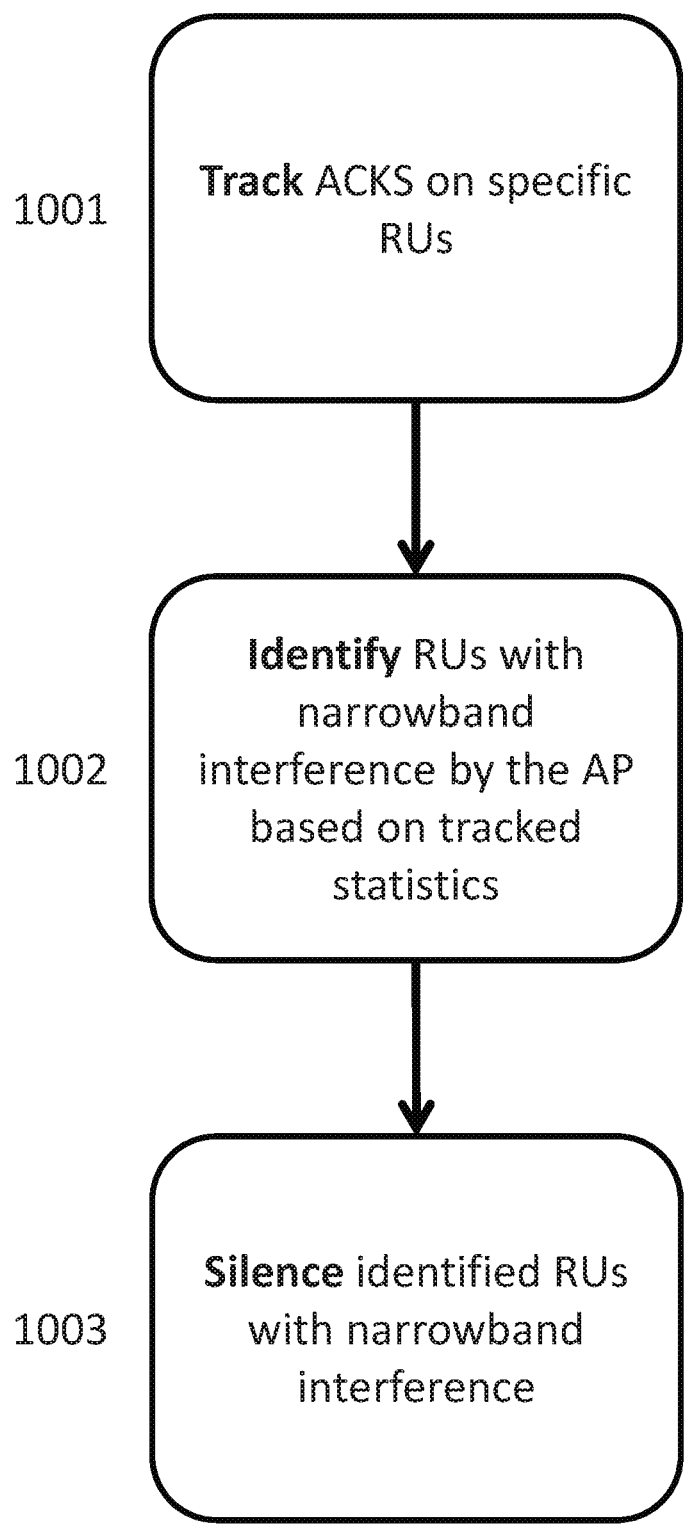
FIG. 10 is a an example process of narrowband interference avoidance procedures according to one or more embodiments.

RU silencing may accomplish narrowband interference avoidance in one or more embodiments such as shown in an example procedure of FIG. 10. At 1001 the AP may track the packet success/failure (e.g. ACKs) for OFDMA transmission (downlink or uplink) on a 26 tone RU granularity according to a RU allocation, such as that disclosed in FIG. 8.

In one embodiment as shown in FIG. 11, each smallest possible RU may correlate to an error tracking mechanism such as a storage bucket. The storage bucket may be allocated as shown in FIG. 11 where storage bucket 1 correlates to RU1, storage bucket 2 correlates to RU2, and so forth. Additionally, RU10 would encompass storage bucket 1 and 2. The allocation of storage buckets is similar to the RU allocation as shown in FIG. 8. In one example of FIG. 11, if the packet for RU 1 fails then storage bucket 1 may be incremented; in an alternative example in this embodiment, if RU 10 fails, storage buckets 1 and 2 are incremented. These increments to the storage buckets may provide error statistics for the network.

Returning to the example process of FIG. 10, in scenarios with narrow band interference, the error statistics of the storage buckets may indicate the presence of narrow band interference in the network and at 1002 the AP can use these indications to identify specific RUs with narrowband interference. At 1003 the AP may schedule OFDMA transmissions that silence the RUs corresponding to the narrowband interference statistics tracked earlier using the RU silencing mechanism in the HE-SIG-B of the trigger frames as described herein.

Figure 12A:
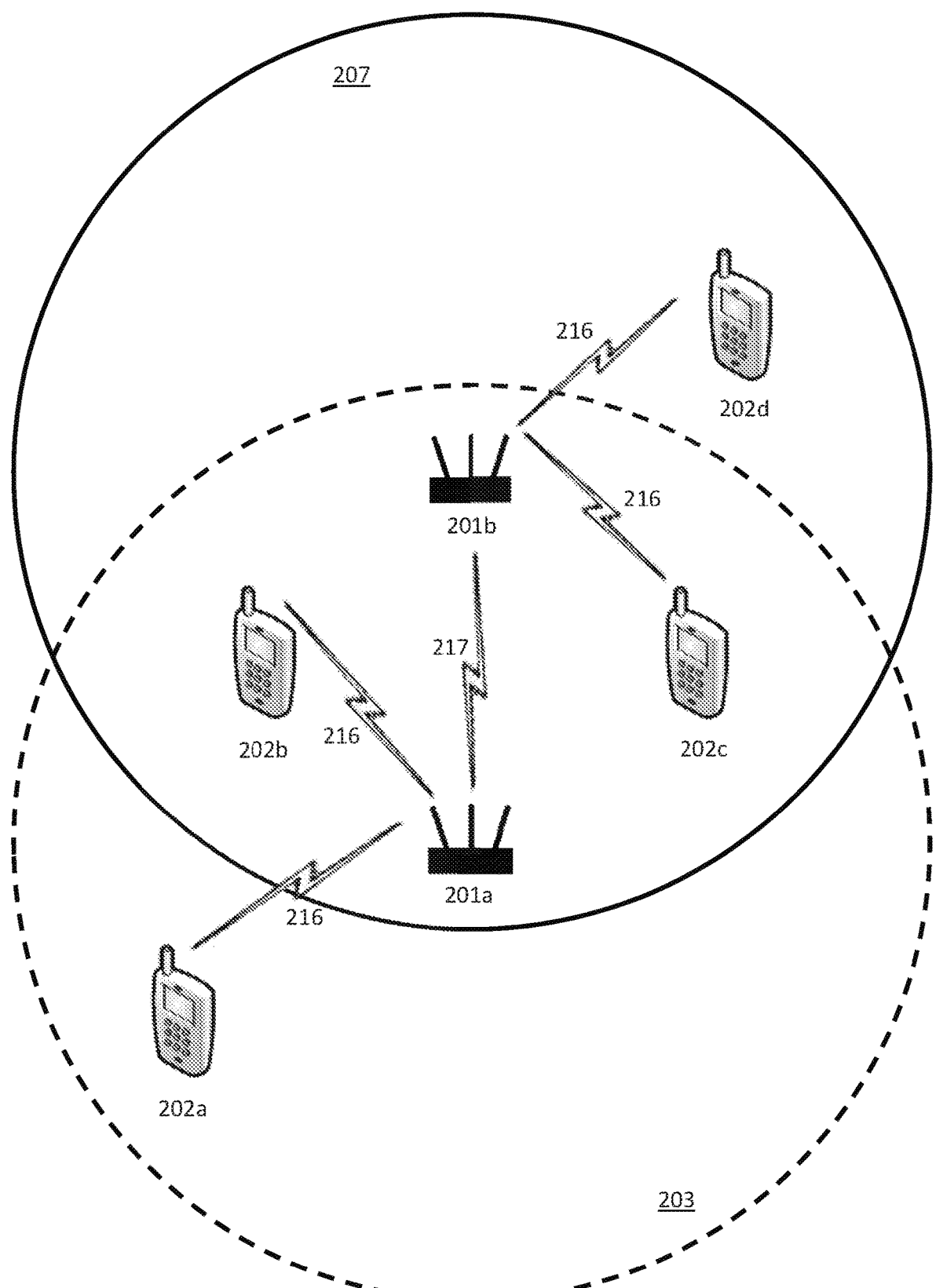
FIG. 12A is a system diagram of an example communication scenario that may occur within the communications system illustrated in FIG. 2.

RU silencing may also be used to mitigate interference in situations, for example, as shown in FIG. 12A. In FIG. 12A an example setup is shown where one BSS 203 of AP 201a has overlapping coverage with a second BSS 207 of AP 201b, otherwise called Overlapping BSS (OBSS); further, WTRUs 202b and 202a are connected to BSS 203 of AP 201a and WTRUs 202c and 202d are connected to BSS 207 of AP 201b.

Figure 12B:
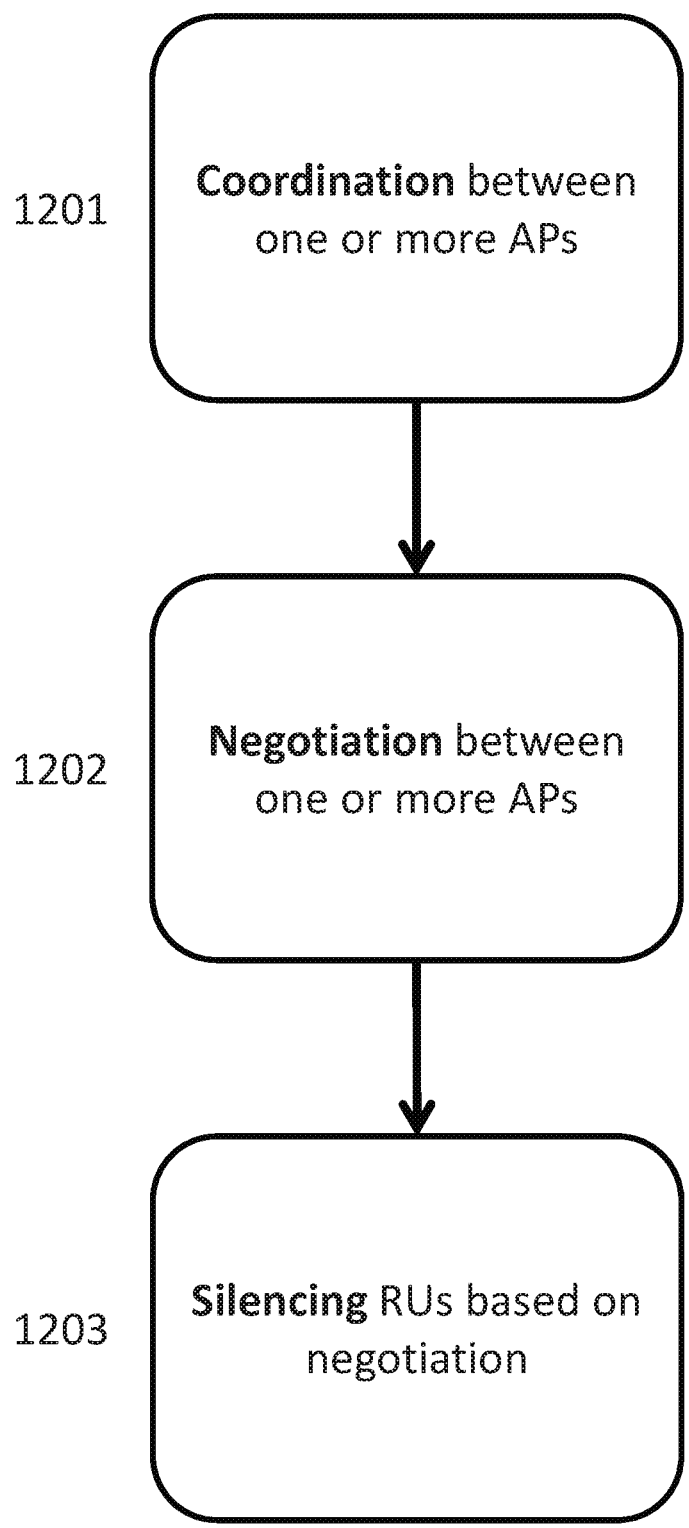
FIG. 12B is an example process of interference mitigation procedure according to one or more embodiments.

Using RU silencing to mitigate interference in such an example as shown in FIG. 12A may be accomplished by a procedure as shown in FIG. 12B. In one embodiment, at 1201 the AP 201a may coordinate wirelessly 217 with AP 201b. Alternatively, AP 201a and AP 201b may communication through another direct or indirect wired connection. At 1202 APs 201a and 201b may negotiate by indicating preferred RUs for transmission to enable interference mitigation in dense networks. In another embodiment, there may be more than two APs, the coordination and negotiation may be centralized or distributed, and/or the coordination and negotiation may be performed by another WTRU or AP connected over a network but external to the involved BSS.

At 1203 the AP 201a may schedule OFDMA transmissions that silence the RUs based on the negotiation of 1202, such as silencing RUs of the OBSS of 203 and 207 that interfere with each other by using the RU silencing mechanism in the HE-SIG-B of the trigger frames as described herein. Alternatively, RUs may be selected in such a way that APs that interfere with each other set preferred RUs orthogonal to each other Further, the RU suppression mechanism in a DL HE-MU-PPDU, using subchannelization, may allocate different transmit powers to different RU allocations allowing a lower amount of energy to be transmitted on a given resource. The transmit power used in each RU may be set to a value less than a threshold (required to suppress the interference at the OBSS) but greater than or equal to the transmit power required to transmit between transmitter and receiver successfully.

In a communication system using a MU-MIMO scheme, such as that in FIG. 2, uplink transmissions for WTRUs with different processing capabilities and timing offsets may occur. When multiple WTRUs transmit together, the transmitted packets may arrive at the receiver (e.g. AP) at distinct time instants. This may occur because the AP may have different round-trip propagation delays and/or processing delays from all WTRUs. Methods may be considered to ensure that the packets at the receiver arrive within a limited window of time based on the different processing capabilities and timing offsets of the WTRUs. To ensure that packets arrive at an AP simultaneously and address timing synchronization and trigger padding for UL MU transmission, at least one embodiment considers a combination of appropriate padding of the trigger frame and timing adjustment.

Figure 13A:
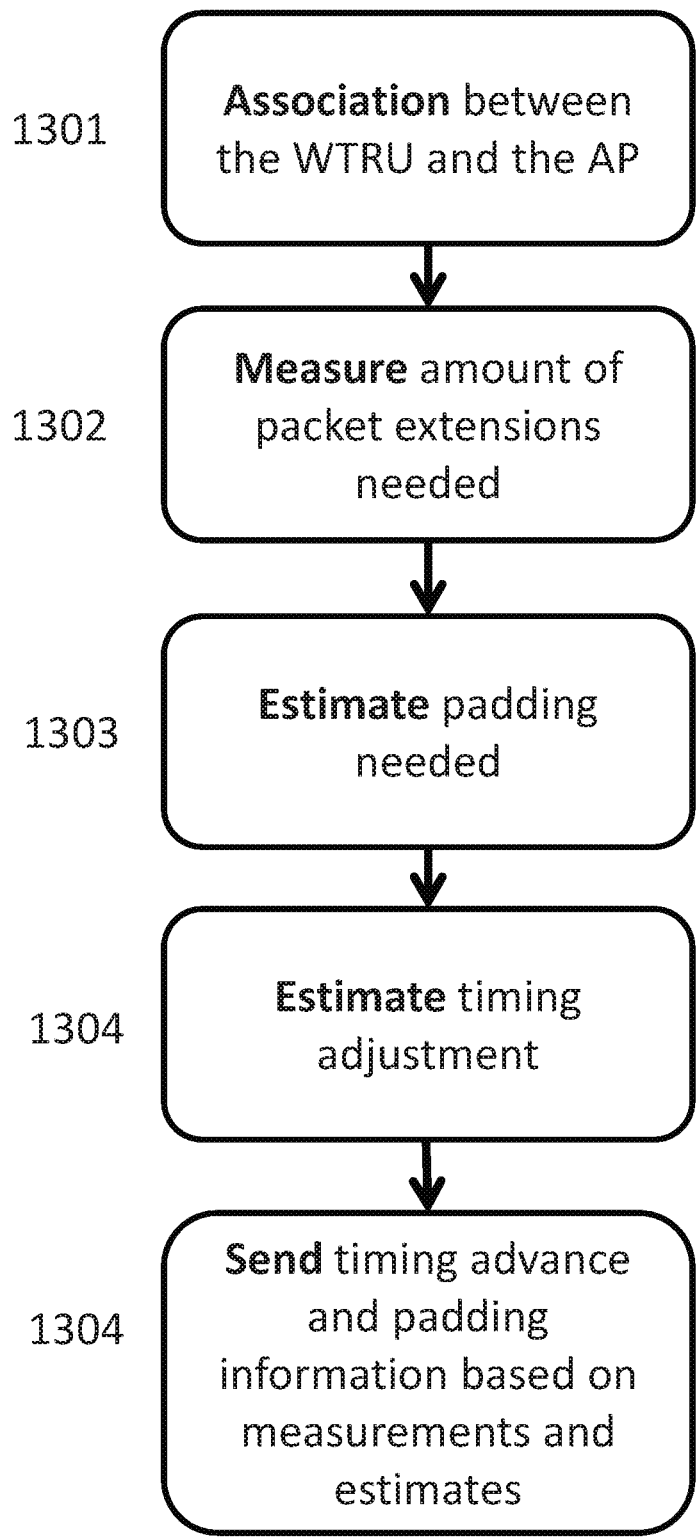
FIG. 13A is an example process of timing synchronization and trigger padding for UL MU transmission according to one or more embodiments.

FIG. 13A shows an example procedure to address trigger padding in one or more embodiments. At 1301, an association may occur between the WTRU and the AP. The WTRU association may include a WTRU sending a probe request to the AP, the AP sending a probe response informing the WTRU of its capabilities, the WTRU performing authentication and sending an association request to an AP indication it wants to join the BSS, and the AP sending an association response indicating whether the WTRU is approved.

At 1302, during a WTRU association performed at the time the WTRU comes into the BSS, the AP may measure or estimate the amount of packet extension needed by each WTRU to enable the AP to estimate the padding level. Alternatively, the WTRU may send the amount of packet extension needed by the WTRU as a parameter to the AP during association response or as capability information.

At 1303, the AP may estimate the padding needed to ensure all WTRUs are able to complete processing of the trigger frame and reply within a SIFS of the end of the trigger frame. A smaller padding may be used for WTRUs that may process the trigger frame faster, while a larger padding may be used for WTRUs that may take a longer time to process the trigger frame. Thus, the SIFS may be determined by the AP based on the capabilities of the WTRUs.

In one embodiment, the padding may be implemented as a packet extension on the trigger frame for HE-PPDU triggers. Alternatively or in addition to, the padding may be implemented as an aggregated dummy MAC frame for non-HT based PPDU triggers.

At 1304, the AP may estimate the timing adjustment to ensure that all WTRUs align their transmissions at the AP.

WTRUs with large propagation delay may begin transmission early, while WTRUs experiencing a small propagation may begin transmission later.

In the previous frame exchanges the AP may measure the transmission time and response time for WTRU, which the WTRU uses for sending an acknowledgment (ACK) back. The AP may maintain a list of propagation delays for each WTRU. The AP may use this list for identification of WTRUs to group together for subsequent associated UL-COBRA transmissions. The AP may also use this information to estimate the timing advance required for each WTRU, or group of WTRUs and the overall padding needed for the trigger frame. Accordingly, the alignment of transmissions for the WTRUs in an MU group may be a function of both padding and timing adjustment.

In an example, it may be assumed that n WTRUs are present (e.g., WTRU 1, WTRU 2, ..., WTRU n) with corresponding packet extension padding parameters of (alpha_1, alpha_2, ..., alpha_n) and timing adjustments of (t1, t2, ..., tn), then to ensure arrival within +/−0.4 usec as required by Task Group ax of 802.11ax (TGax), the following equation may apply:

$$F(alpha\_1, t1) \approx F(alpha\_2, t2) \approx F(alpha\_n, tn)$$

At 1305, the timing advance and padding information may be sent by the AP to each WTRU in an action frame (e.g., a trigger frame) providing an indication of the start of transmission.

In an embodiment, the AP may design the parameters for WTRUi (padding parameter alpha_i and timing adjustment ti) jointly, resulting in separate values of padding parameters alpha and timing adjustments t for each WTRU. In this scenario, the trigger frame may send parameters alpha_i and ti as parameter fields in the HE-SIG-B WTRU specific subfields.

The AP may design the parameter alpha for all WTRUs jointly and then design the parameter ti separately for each WTRU. In this scenario, the trigger frame may send parameter alpha_i in the HE-SIG-B common subfield and each parameter ti as parameter fields in the HE-SIG-B WTRU specific subfields.

For example, alpha may be selected based on the worst case WTRU in the group of WTRUs. In this case, the values of parameter ti for each WTRU may be estimated once and used in any transmission, as the timing adjustment may be based on the round-trip time of any frame transmitted. In addition or as an alternative, parameter alpha may be selected based on a reference level. In this case, the timing adjustment may be estimated for each packet extension (PE) level. The packet may be extended by dummy data to give the receiver time to decode. The PE level may be, for example, ¼, ½, ¾ or 1 OFDM symbol.

Figure 13B:
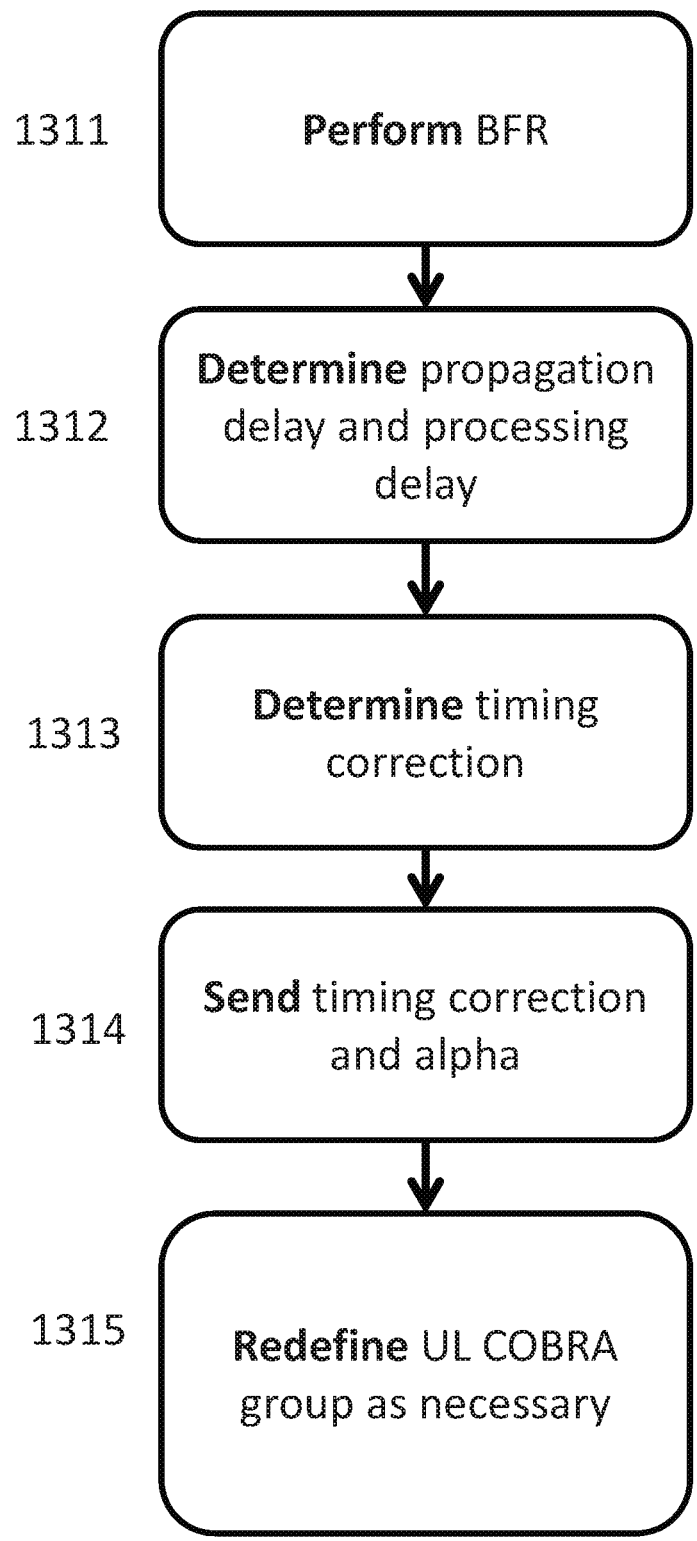
FIG. 13B is an example process of timing synchronization and trigger padding for UL MU transmission according to one or more embodiments.

FIG. 13B shows an example of a procedure to address time synchronization. At 1311 the AP may perform a Buffer Status Request (BSR) to all WTRUs belonging to a group to determine WTRUs that have data to send. In the BSR frame, the AP may request the intended WTRUs to report the timestamp of the BSR response frame. Within the BSR response frame, the $k^{th}$ WTRU may report its own timestamp T0k.

The AP may record the time of arrival of the BSR response frame for the $k^{th}$ WTRU as T1k. At 1312, According to T0k, T1k and the transmission order and duration of BSR response frame, the AP may determine the total of propagation delay and processing delay of the $k^{th}$ WTRU, and records it as Δk. In addition or alternatively, the AP may request this information during WTRU association.

At 1313, the AP collects all Δk, k=1, ..., K and may determine the timing correction Tk for each WTRU based on the specific padding factor of the WTRU (in the case of a joint estimation) or based on the decided value of padding factor for the UL MU transmission (in the case of separate estimation). A positive value of Tk may represent a timing delay and a negative value of Tk may represent a timing advance, or vice versa.

At 1314, the AP may quantize the parameter Tk and the parameter alpha, and send them to the WTRUs in the trigger frame. When WTRUs receive the parameter Tk, they may perform a timing delay or a timing advance after taking into account the trigger packet extension (i.e., the padding).

At 1315, the AP may redefine the UL COBRA group when a timing correction may not be met (e.g., the time difference between WTRUs is too large) with the current group of WTRUs, or may apply another grouping strategy.

According to the above example procedure, the delay may be utilized for timing correction. In another embodiment, the round trip delay may be utilized to calculate the timing correction.

Although the embodiments described herein consider 802.11 specific protocols, it may be understood that the solutions described herein are not restricted to 802.11 and are applicable to other wireless systems and standards (e.g., LTE, LTE-A, WiMAX, 5G, etc.) as well.

Although SIFS is used to indicate various inter frame spacing in the examples of the designs and procedures, all other inter frame spacing such as Reduced Interframe Space (RIFS) or other agreed time intervals could be applied in the same embodiments.

Although reference is made to specific standards of IEEE 802.11 protocols, embodiments disclosed herein may be used independent of or in conjunction with any IEEE 802.11 protocol.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method carried out by an 802.11 access point (AP) for minimizing interference, the method comprising:
   generating a high efficiency signal-B (HE-SIG-B) field for an orthogonal frequency division multiple access (OFDMA) signal to be transmitted to a plurality of wireless transmit/receive units (WTRUs), wherein the HE-SIG-B field includes a WTRU-identifier (WTRU-ID) element indicating a predetermined value that indicates a resource unit (RU) is silenced; and
   transmitting the OFDMA signal, which includes the HS SIG-B field, to the plurality of WTRUs.

2. The method of claim 1, further comprising:
   determining padding and timing adjustment information for the plurality of WTRUs; and
   sending padding and timing adjustment information to the plurality of WTRUs.

3. The method of claim 1, further comprising: determining to silence the RU based on information from one or more neighboring APs or observations regarding interference statistics.

4. The method of claim 3, further comprising:
   incrementing a storage bucket associated with interference statistics of a packet failure of the RU; and
   marking the RU associated with the storage bucket to be silenced.

5. The method of claim 3, further comprising:
   assessing whether interference statistics of a packet failure rate on a 26 tone RU granularity meets a threshold; and
   marking the RU associated with the packet failure rate to be silenced, on a condition that the threshold is met.

6. The method of claim 3, further comprising:
   receiving a message indicating a preferred RU from the one or more neighboring APs; and
   marking the RU associated with the preferred RU to be silenced.

7. An access point (AP) for minimizing interference, comprising:
   a transceiver;
   a processor operatively connected to the transceiver, the processor and transceiver configured to generate a high efficiency signal-B (HE-SIG-B) field for an orthogonal frequency division multiple access (OFDMA) signal to be transmitted to a plurality of wireless transmit/receive units (WTRUs), wherein the HE-SIG-B field includes a WTRU-identifier (WTRU-ID) element indicating a predetermined value that indicates a resource unit (RU) is silenced; and
   the processor and transceiver further configured to transmit the OFDMA signal, which includes the HE SIG-B field, to the plurality of WTRUs.

8. The AP of claim 7, wherein the processor and transceiver are further configured to:
   determine padding and timing adjustment information for the plurality of WTRUs; and
   send padding and timing adjustment information to the plurality of WTRUs.

9. The AP of claim 7, wherein the processor and transceiver are further configured to: determine to silence the RU based on information from one or more neighboring APs or observations regarding interference statistics.

10. The AP of claim 9, wherein the processor and transceiver are further configured to:
    increment a storage bucket associated with interference statistics of a packet failure of the RU; and
    mark the RU associated with the storage bucket to be silenced.

11. The AP of claim 9, wherein the processor and transceiver are further configured to:
    assess whether interference statistics of a packet failure rate on a 26 tone RU granularity meets a threshold; and
    mark the RU associated with the packet failure rate to be silenced, on a condition that the threshold is met.

12. The AP of claim 9, wherein the processor and transceiver are further configured to:
    receive a message indicating a preferred RU from the one or more neighboring APs; and
    marking the RU associated with the preferred RU to be silenced.

13. A method performed by a wireless transmit/receive unit (WTRU), the method comprising:
    receiving, from an 802.11 access point (AP), an orthogonal frequency division multiple access (OFDMA) signal including a preamble with a WTRU specific high efficiency common signal-B (HE-SIG-B) field, wherein the HE-SIG-B field includes a WTRU identifier (WTRU-ID) element indicating a predetermined value; and
    determining that the predetermined value indicates a resource unit (RU) is silenced.

* * * * *